US012416412B2

(12) United States Patent
Carter et al.

(10) Patent No.: US 12,416,412 B2
(45) Date of Patent: Sep. 16, 2025

(54) FIREBOX BASKET FOR BARBECUE GRILL OR SMOKER

(71) Applicant: MASTERBUILT MANUFACTURING, LLC, Columbus, GA (US)

(72) Inventors: Adam Carter, Auburn, AL (US); Donald Stephen Gazdick, Suwanee, GA (US); Robert V. Terrell, Auburn, AL (US); Daniel Mercer, Hamilton, GA (US); Joseph Pruitt, Athens, GA (US)

(73) Assignee: MASTERBUILT MANUFACTURING, LLC, Columbus, GA (US)

( * ) Notice: Subject to any disclaimer, the term of this patent is extended or adjusted under 35 U.S.C. 154(b) by 401 days.

(21) Appl. No.: 17/890,387

(22) Filed: Aug. 18, 2022

(65) Prior Publication Data

US 2023/0055811 A1 Feb. 23, 2023

Related U.S. Application Data

(60) Provisional application No. 63/235,034, filed on Aug. 19, 2021.

(51) Int. Cl.

| | |
|---|---|
| ***F23H 17/10*** | (2006.01) |
| ***F24B 13/00*** | (2006.01) |
| ***F24B 13/02*** | (2006.01) |

(52) U.S. Cl.

CPC ............. *F24B 13/02* (2013.01); *F23H 17/10* (2013.01); *F24B 13/008* (2013.01); *F23H 2900/17001* (2013.01)

(58) Field of Classification Search

CPC .. A47J 37/0704; A47J 37/0786; A47J 37/047; F24B 13/02; F24B 13/008; F23H 17/00; F23H 17/10; F23H 2900/7001; F23M 5/02

USPC ........................................................ 126/25 R

See application file for complete search history.

(56) References Cited

U.S. PATENT DOCUMENTS

| | | | | |
|---|---|---|---|---|
| 2016/0007622 A1* | 1/2016 | Bowyer | A47J 37/0704 99/482 |
| 2017/0370593 A1* | 12/2017 | Kohli | A47J 37/0704 |
| 2020/0096199 A1* | 3/2020 | Harrington | F24B 5/025 |
| 2020/0281404 A1* | 9/2020 | Benson | A47J 37/0759 |
| 2021/0228026 A1* | 7/2021 | Bahreinian | F23L 9/06 |

* cited by examiner

*Primary Examiner* — Avinash A Savani

(74) *Attorney, Agent, or Firm* — Crowell & Moring LLP

(57) ABSTRACT

The present disclosure is directed to a firebox basket for a barbeque grill or smoker. In one form, the present disclosure provides a grill comprising an ash depository, a firebox basket positioned in the grill above the ash depository; and a cooking rack positioned above the firebox basket. The firebox basket comprises: a support basket defining an internal area, the support basket comprising: a plurality of concentrically stacked rungs that define a side wall of the firebox basket; and a grate positioned at a bottom of the plurality of concentrically stacked rungs; and a plurality of ceramic pieces disposed within the support basket. The support basket is configured to support the plurality of ceramic pieces around the internal area of the support basket.

15 Claims, 5 Drawing Sheets

FIREBOX BASKET FOR BARBECUE GRILL OR SMOKER

RELATED APPLICATIONS

The present application claims priority to U.S. Provisional Patent Application No. 63/235,034, filed Aug. 19, 2021, the entirety of which is hereby incorporated by reference.

BACKGROUND

Kamado-style grills and kettle grills are designed to hold fuel, such as charcoal and wood, in a bottom portion of the grill. Some kamado-style grills comprise a separate firebox unit composed of ceramic to hold the fuel. These firebox units are typically very heavy and can be supported by the ceramic outer shell of the kamado-style grill. The benefit of the ceramic firebox is it can retain heat from the burning fuel within the firebox.

Kettle-style grills, on the other hand, may hold fuel directly in the bottom portion without a separate firebox unit. Kettle-style grills are typically composed of metal and a kamado-style ceramic firebox may be too heavy to be placed directly within a metal kettle-style grill.

Over time, firebox units may break due to being constantly subjected to high temperatures. Thus, it may become necessary to replace the firebox unit. Current designs for firebox units are cumbersome and hard to replace.

Thus, there is a need for a less cumbersome firebox design that maintains the benefits of ceramic fireboxes while addressing the issues of their weight and replaceability.

SUMMARY OF THE DISCLOSURE

The present disclosure addresses the above problems and provides a firebox basket for a barbecue grill or smoker.

In one form, the present disclosure provides a firebox basket configured to use with a grill. The firebox basket comprises: a support basket defining an internal area and a plurality of ceramic pieces disposed within the support basket, wherein the support basket is configured to support the plurality of ceramic pieces around the internal area of the support basket.

In some implementations, at least one ceramic piece of the plurality of ceramic pieces is configured to be removable from the firebox basket.

In another form, the present disclosure provides a grill comprising an ash depository; a firebox basket positioned in the grill above the ash depository; and a cooking rack positioned above the firebox basket.

The firebox basket comprises a support basket and a plurality of ceramic pieces. The support basket defines an internal area and comprises a plurality of concentrically stacked rungs that define a side wall of a charcoal basket, and a grate positioned at a bottom of the plurality of concentrically stacked rungs. The plurality of ceramic pieces is disposed within the support basket, wherein the support basket is configured to support the plurality of ceramic pieces around the internal area of the support basket and wherein at least one of the ceramic pieces of the plurality of ceramic pieces is configured to be removable from the firebox basket.

DETAILED DESCRIPTION OF THE DRAWINGS

Embodiments and implementations of the present disclosure provide an improved firebox basket for use in a barbecue grill or smoker. In one form, the firebox basket may be designed for use in any kettle grill. However, it should be appreciated that in other forms, the firebox basket could be modified for use in a kamado-style grill or any other type of grill or smoker.

Figure 1:
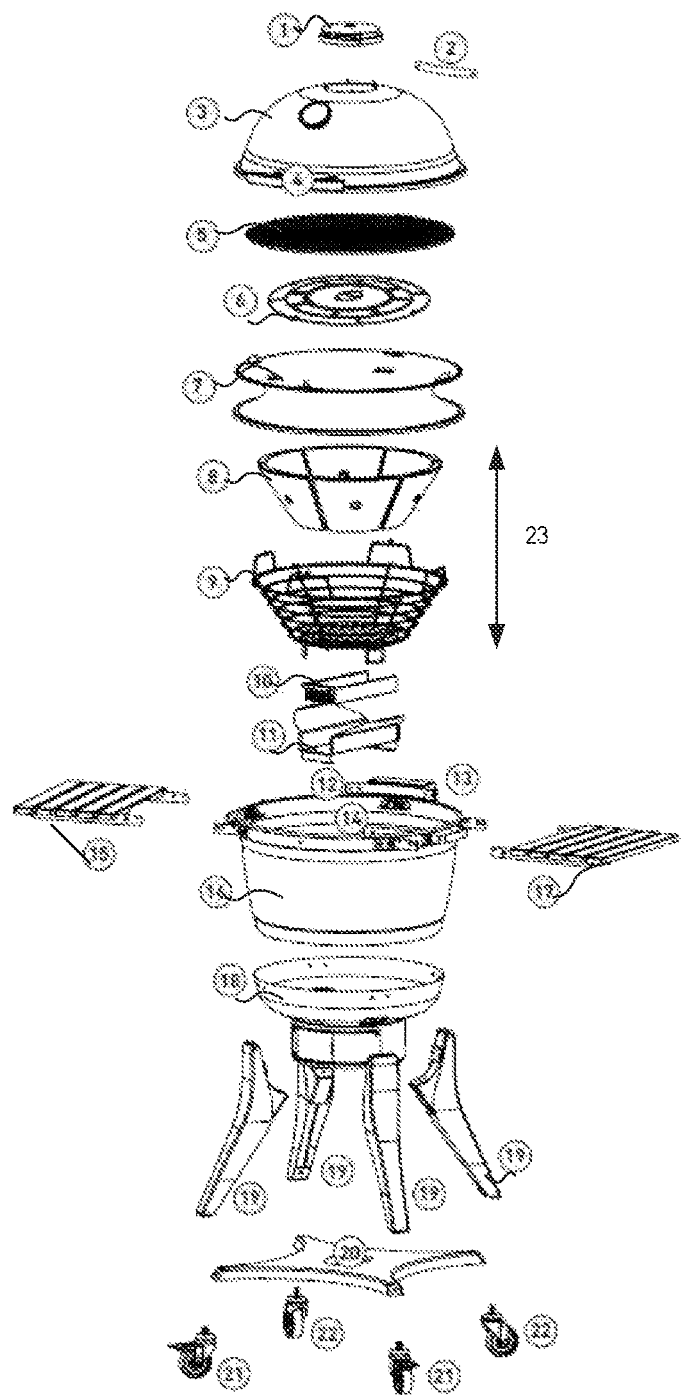
FIG. 1 is an exploded diagram of a grill including one form of a firebox basket.
Figure 2:
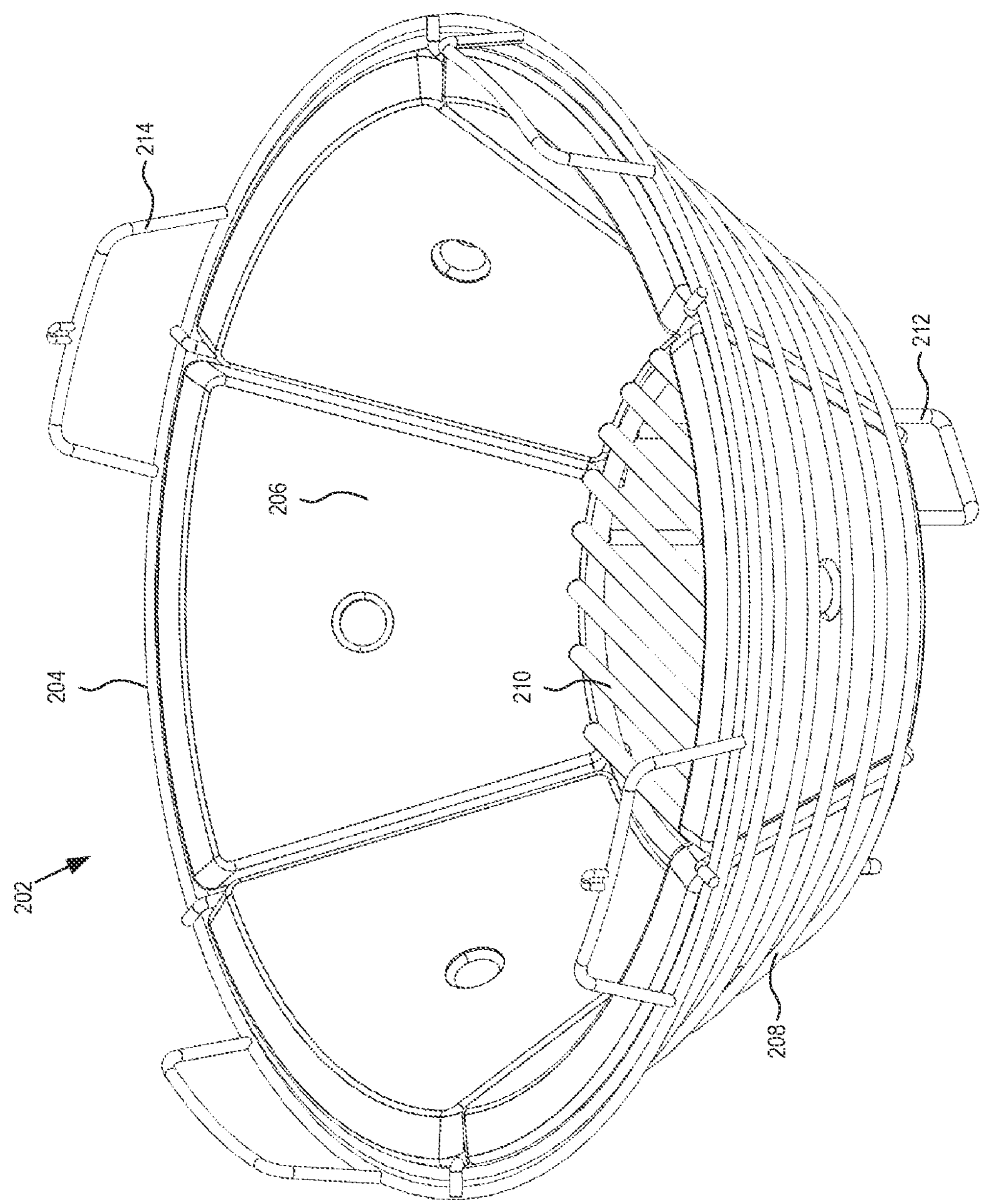
FIG. 2 is a perspective view of one form a firebox basket for a barbeque grill or smoker.
Figure 3:
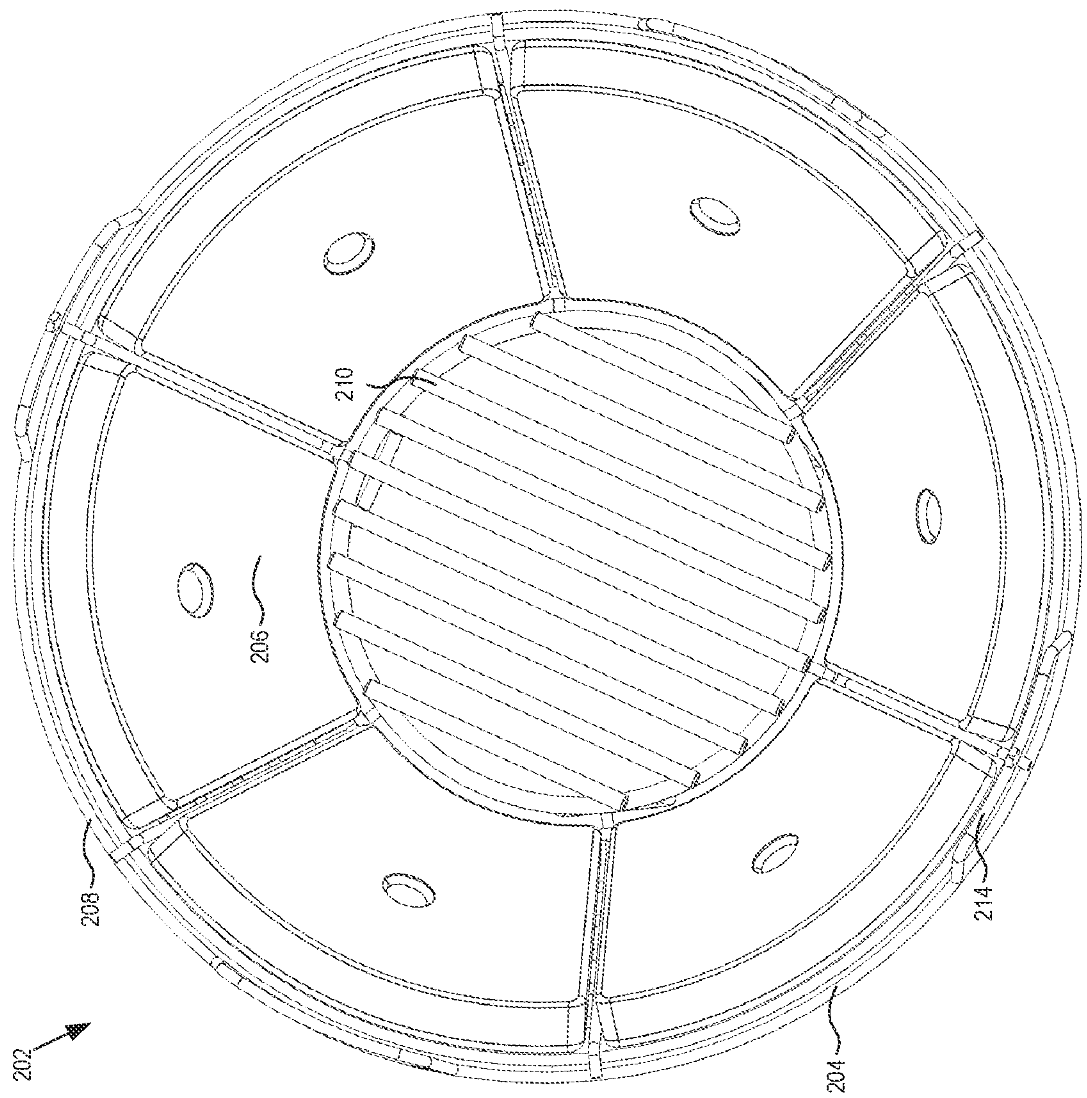
FIG. 3 is a top view of one form of a firebox basket for a barbeque grill or smoker.
Figure 4:
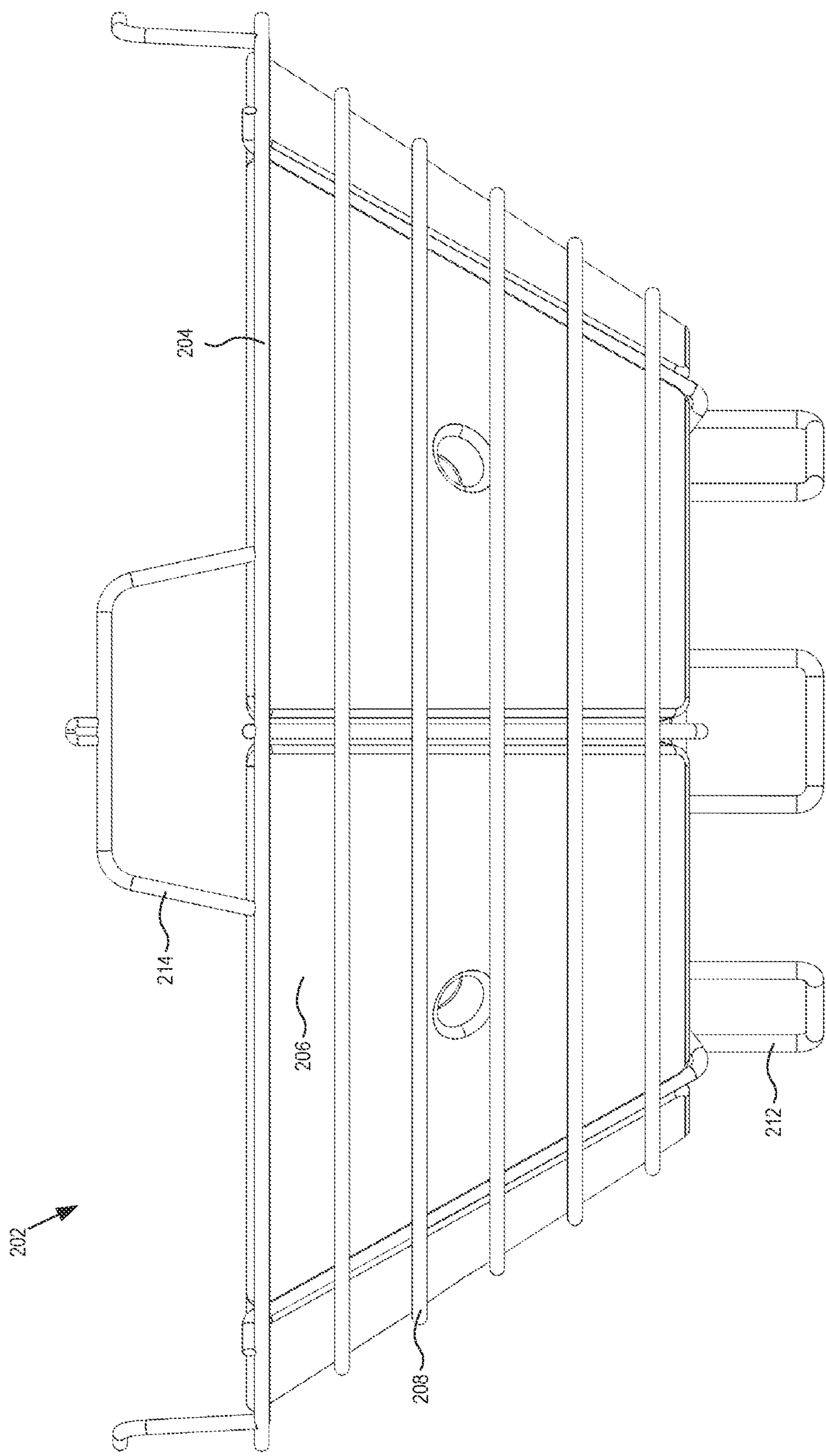
FIG. 4 is a side view of one form of a firebox basket for a barbeque grill or smoker.

FIG. 1 is an exploded diagram of one form a grill 100 including a firebox basket. The grill 100 includes a KONTROL TOWER top vent 1, a lid handle bracket 2, a grill dome 3, a lid handle 4, half moon cooking grates/rack 5, a heat deflector 6, a KETTLE SLOROLLER 7, a plurality of ceramic plates 8, a support basket 9, an ash drawer 10, an ash drawer base 11, a hinge/lid bracket 12, a hinge 13, a hinge bracket 14, a left-side shelf 15, a grill base 16, a right-side shelf 17, a grill base bottom 18, legs 19, a bottom plate 20, locking swivel casters 21, and non-locking swivel casters 22. One form of a firebox basket 23 including the plurality of ceramic plates 8 and the support basket 9 is described below FIGS. 2-5 illustrate different views of a firebox basket 202 for use in a barbeque grill or smoker such as the grill 100 illustrated in FIG. 1. A firebox basket 202 may comprise a support basket 204 and a plurality of ceramic pieces 206 disposed within the support basket 204. In some implementations, the support basket 204 is configured to support the plurality of ceramic pieces 206 around an internal area defined by the support basket 204. In some implementations, the plurality of ceramic pieces 206 may each be independently removable and replaceable. However, in other implementations, not all of the ceramic pieces 206 may be removable, and in such implementations, at least one ceramic piece may be permanently incorporated into the structure of the firebox basket 202. The use of the plurality of ceramic pieces 206 in conjunction with the support basket 204 improves temperature stability and heat retention of any kettle grill.

In some implementations, the support basket 204 comprises a plurality of concentrically stacked rungs 208 forming a side wall of the firebox basket 202. In some implementations, the concentrically stacked rungs 208 may comprise a space in between each adjacent rung. In some implementations, the stacked rungs 208 may each be circular in shape and of sequentially different sizes such that the basket appears tapered. In some implementations, the plurality of concentrically stacked rungs 208 comprises of a metal, such as stainless steel. However, it should be understood that the support basket 204 may have any shape so as to correspond to any desired application.

The firebox basket 202 can further comprise a grate 210 disposed in a bottom portion of the firebox basket 202 that comprises a plurality of bars. The grate 210 can be configured to support fuel, such as charcoal and/or wood, thereon. In some implementations, the grate 210 is positioned to support fuel above an ash depository (item 10 in FIG. 1). For instance, the firebox basket 202 may comprise a plurality of feet 212 configured to support the support basket 204 above the ash depository. In some implementations, the space between the bars can be optimized to improve fuel burning within the firebox basket 202.

Figure 5:
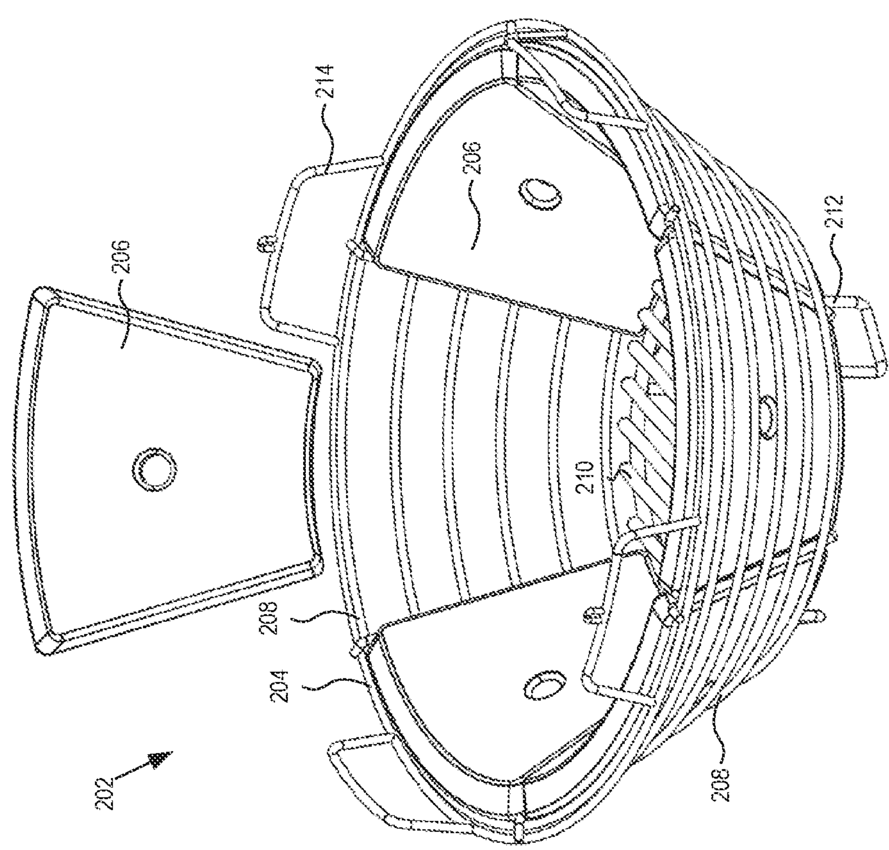
FIG. 5 is a perspective view of one form of a firebox basket for a barbeque grill or smoker showing a ceramic plate removed from the support basket.

In some implementations, the grate 210 and at least a bottom rung of the plurality of concentrically stacked rungs 208 define a support space configured to receive the plurality of ceramic pieces 206. In some implementations, the support space is disposed around an outer perimeter of the grate 210, as shown in FIG. 5.

The plurality of ceramic pieces 206 may be disposed within the support basket 204. In some implementations, the plurality of ceramic pieces 206 are shaped to be a plurality of ceramic side-wall pieces that are removable from within the support basket 204. In some implementations, the side-wall ceramic pieces 206 are shaped in a curved trapezoid such that when arranged in an orderly fashion around the interior of the side walls of the support basket 204, the plurality of ceramic pieces 206 substantially cover an area defined by the interior of the firebox basket 202.

In some implementations, the ceramic pieces of the plurality of ceramic pieces 206 may be composed of a thick ceramic material. As noted above, in some implementations, each ceramic piece of the plurality of ceramic pieces 206 may be independently removable from within the support basket 204. This can allow for both retention of heat within the basket in addition to ease of cleaning and replacement of broken ceramic pieces.

When firebox baskets 202, such as those described above, are used in conjunction with a barbecue grill and smoker, the firebox basket 202 can be placed in a bottom shell of the grill where fuel is typically placed. Accordingly, fuel can be placed within the firebox basket 202. In some implementations, the firebox basket can further comprise a plurality of handles 214 disposed about a top portion of the support basket 204 such that the firebox basket 202 can be suspended within the grill using one or more of the handles 214. Further, in some implementations, a cooking rack (item 5 in FIG. 1) can be placed on top of the firebox basket 202 so that food can be cooked or smoked directly over the fuel in the firebox basket 202. For instance, the cooking rack can be placed directly on top of the plurality of handles 214 of the firebox basket 202.

Although embodiments and implementations of the present disclosure have been described in detail above, the present disclosure is not limited to these specific embodiments and implementations, and various modifications and changes can be made within the scope of the disclosure. Therefore, it is intended that this disclosure not be limited to the particular embodiments and implementations disclosed, but that the disclosure will include all embodiments and implementations falling within the scope of the appended claims.

The invention claimed is:

1. A firebox basket configured to use with a grill, comprising:

a support basket defining an internal area, the support basket comprising:

a plurality of concentrically stacked rungs that define a side wall of the firebox basket; and a grate positioned at a bottom of the plurality of concentrically stacked rungs, the grate comprising a plurality of bars;

a plurality of feet configured to support the support basket above an ash depository of the grill; and a plurality of ceramic pieces disposed within the support basket;

wherein the support basket is configured to support the plurality of ceramic pieces around the internal area of the support basket; and wherein the positioning of the support basket above the ash depository by the plurality of feet, together with a positioning of the plurality of bars, optimize the burning of fuel that is burning within the firebox basket.

2. The firebox basket of claim 1, wherein at least one ceramic piece of the plurality of ceramic pieces is configured to be removable from the firebox basket.

3. The firebox basket of claim 1, wherein at least one ceramic piece of the plurality of ceramic pieces permanently incorporated into the firebox basket.

4. The firebox basket of claim 1, wherein at least a bottom rung of the plurality of concentrically stacked rungs and the grate define a support space configured to receive the plurality of ceramic pieces.

5. The firebox basket of claim 4, wherein the support space is disposed around an outer perimeter of the grate.

6. The firebox basket of claim 1, wherein the plurality of concentrically stacked rungs defines a space between adjacent rungs of the plurality of concentrically stacked rungs.

7. The firebox basket of claim 1, wherein the rungs of the plurality of concentrically stacked rungs are different sizes.

8. The firebox basket of claim 1, wherein the rungs of the plurality of concentrically stacked rungs are circular.

9. The firebox basket of claim 1, wherein the rungs of the plurality of concentrically stacked rungs comprise metal.

10. The firebox basket of claim 9, wherein the metal is stainless steel.

11. The firebox basket of claim 1, wherein the ceramic pieces of the plurality of ceramic pieces are shaped as a curved trapezoid.

12. A grill comprising:

an ash depository;

a firebox basket positioned in the grill above the ash depository; and a cooking rack positioned above the firebox basket;

wherein the firebox basket comprises:

a support basket defining an internal area, the support basket comprising:

a plurality of concentrically stacked rungs that define a side wall of the firebox basket; and a grate positioned at a bottom of the plurality of concentrically stacked rungs, the grate comprising a plurality of bars;

a plurality of ceramic pieces disposed within the support basket; and a plurality of feet configured to support the support basket above the ash depository such that a position of the support basket, together with positioning of the plurality of bar, optimize burning of fuel within the firebox basket;

wherein the support basket is configured to support the plurality of ceramic pieces around the internal area of the support basket; and wherein at least one of the ceramic pieces of the plurality of ceramic pieces is configured to be removable from the firebox basket.

13. The grill of claim 12, wherein at least one ceramic piece of the plurality of ceramic pieces permanently incorporated into the firebox basket.

14. The grill of claim 12, wherein the rungs of the plurality of concentrically stacked rungs are circular.

15. The grill of claim 12, wherein the rungs of the plurality of concentrically stacked rungs comprise stainless steel.

* * * * *